(12) United States Patent
Nakamura

(10) Patent No.: US 8,625,449 B2
(45) Date of Patent: Jan. 7, 2014

(54) WIRELESS ACCESS SYSTEM

(75) Inventor: Masaru Nakamura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 114 days.

(21) Appl. No.: 13/067,440

(22) Filed: Jun. 1, 2011

(65) Prior Publication Data

US 2012/0008553 A1 Jan. 12, 2012

(30) Foreign Application Priority Data

Jul. 12, 2010 (JP) ................................. 2010-157591

(51) Int. Cl.
*H04J 3/14* (2006.01)
*H04B 7/212* (2006.01)
*H04W 4/00* (2009.01)

(52) U.S. Cl.
USPC ............ 370/252; 370/322; 370/328; 370/443

(58) Field of Classification Search
None
See application file for complete search history.

(56) References Cited

U.S. PATENT DOCUMENTS

| | | | |
|---|---|---|---|
| 6,937,592 B1 * | 8/2005 | Heath et al. .................... | 370/342 |
| 7,418,027 B2 | 8/2008 | Nakamura | |
| 2003/0169720 A1 * | 9/2003 | Sebastian et al. ............. | 370/342 |
| 2004/0136349 A1 | 7/2004 | Walton et al. | |
| 2007/0294456 A1 | 12/2007 | Chan et al. | |
| 2007/0300004 A1 | 12/2007 | Yun | |
| 2008/0267098 A1 | 10/2008 | Walton et al. | |
| 2008/0267138 A1 | 10/2008 | Walton et al. | |
| 2009/0252100 A1 * | 10/2009 | Sridhara et al. ................ | 370/329 |
| 2009/0279523 A1 | 11/2009 | Doi et al. | |
| 2010/0027523 A1 | 2/2010 | Chan et al. | |
| 2010/0119001 A1 | 5/2010 | Walton et al. | |
| 2010/0202347 A1 * | 8/2010 | Sridhara et al. ................ | 370/328 |
| 2011/0034175 A1 * | 2/2011 | Fong et al. ..................... | 455/450 |
| 2012/0057535 A1 * | 3/2012 | Zhang et al. ................... | 370/329 |
| 2012/0176887 A1 * | 7/2012 | Mcbeath et al. ............... | 370/216 |
| 2012/0218968 A1 * | 8/2012 | Kim et al. ...................... | 370/329 |

FOREIGN PATENT DOCUMENTS

| | | |
|---|---|---|
| EP | 1 870 819 | 12/2007 |
| JP | 3859140 | 9/2006 |
| JP | 3926669 | 3/2007 |
| WO | WO 2004/038984 | 5/2004 |
| WO | WO 2007/147353 | 12/2007 |

OTHER PUBLICATIONS

U.S. Appl. No. 61/258,198, Kim et al., Method of Estimating Channel State Information, Nov. 5, 2009, pp. 24-31.*
U.S. Appl. No. 61/309,727, Zhang et al., Method and Apparatus for Uplink COMP on PUSCH, PUCCH and PRACH Channels, Mar. 2, 2010, [0050].*

(Continued)

*Primary Examiner* — Chirag Shah
*Assistant Examiner* — Ashley Shivers
(74) *Attorney, Agent, or Firm* — Harness, Dickey & Pierce, P.L.C.

(57) ABSTRACT

A wireless access system, including plural wireless control stations; a wireless terminal device to transmit and receive data to and from the plural wireless control stations, wherein the wireless control stations adjust with each other to reserve data transmission periods so as not to overlap with those of the other wireless control stations and transmit data in the reserved periods, and the wireless terminal device transmits data to at least one of the wireless control stations through space-division multiple access communication.

3 Claims, 5 Drawing Sheets

(56) References Cited

OTHER PUBLICATIONS

U.S. Appl. No. 61/243,795, Mcbeath et al., Method and System for Hybrid Automatic Repeat Request Operation for Uplink Coordinated Multi-point Signaling, Sep. 18, 2009, [0020]-[0022].*

European Search Report dated Oct. 31, 2011, issued in European Patent Application No. 11166819.0.
Abstract of JP 2004-032035 published on Jan. 29, 2004.
Abstract of JP 2003-318808 published on Nov. 7, 2003.

* cited by examiner

WIRELESS ACCESS SYSTEM

BACKGROUND OF THE INVENTION

1. Field of the Invention

The present invention relates to a wireless access system using a space-division multiple access communication as multiple wireless communication.

2. Discussion of the Related Art

Conventionally, as disclosed in Japanese Patent No. 3926669, a wireless access system including a wireless control station and at least one wireless terminal device is known, in which the wireless control station transmits data in compliance with each of the wireless terminal devices through space-division multiple access communication. Meanwhile, data transmission to a wireless terminal device located in each directional space divided by space-division multiple access communication control is exclusively permitted, and time-division data are transmitted to the wireless control station while the wireless terminal device is permitted to transmit data by the wireless control station.

In the conventional wireless access system, data are transmitted from the wireless control station to the wireless terminal device through space-division multiple access communication in down transmission, and from the wireless terminal device to the wireless control station through time-division multiple access communication in up transmission. Therefore, in multiple access communication between the wireless control station and the wireless terminal device, interference between wireless transmission signals from the wireless terminal device is prevented, and interference waves at the wireless control station do not need removing.

However, multiple access communication between plural wireless control stations and wireless terminal devices is not considered.

In particular, a feasible technology for sharing one wireless terminal device among plural wireless control stations and controlling access is not disclosed.

SUMMARY OF THE INVENTION

Accordingly, an object of the present invention is to provide a wireless access system capable of preventing interference with wireless transmission signals between the wireless control stations without needing removal of interference waves in the wireless terminal device in multiple wireless communication between plural wireless control stations and wireless terminal devices.

Another object of the present invention is to provide a wireless terminal device.

A further object of the present invention is to provide a wireless access method.

To achieve such objects, the present invention contemplates the provision of a wireless access system, comprising:
plural wireless control stations;
a wireless terminal device to transmit and receive data to and from the plural wireless control stations,
wherein the wireless control stations adjust with each other to reserve data transmission periods so as not to overlap with those of the other wireless control stations and transmit data in the reserved periods, and
the wireless terminal device transmits data to at least one of the wireless control stations through space-division multiple access communication.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Generally, the present invention provides a wireless access system largely improving communication capacity through space-division multiple access communication when transmitting from a wireless terminal in multiple wireless communication between plural wireless control stations and wireless terminal devices and preventing interferences between wireless transmission signals from the wireless control station when transmitting to need no removal of interference waves in the wireless terminal device. More particularly, the present invention relates to a wireless access system, comprising:
plural wireless control stations;
a wireless terminal device to transmit and receive data to and from the plural wireless control stations,
wherein the wireless control stations adjust with each other to reserve data transmission periods so as not to overlap with those of the other wireless control stations and transmit data in the reserved periods, and
the wireless terminal device transmits data to at least one of the wireless control stations through space-division multiple access communication.

Figure 1:
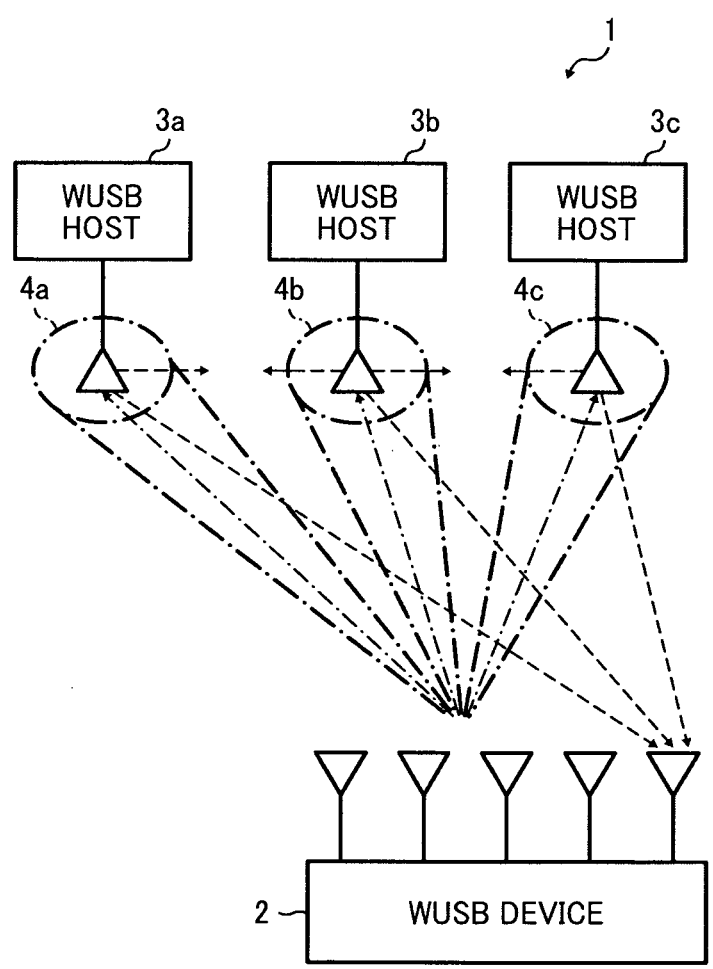
FIG. 1 is a block diagram of an embodiment of the wireless access system of the present invention.

As shown in FIG. 1, an embodiment of the wireless access system of the present invention includes a WUSB device 2 and plural WUSB hosts 3a to 3c. In FIG. 1, three WUSB hosts 3a to 3c are shown, but the number of the WUSB hosts is not limited thereto.

The WUSB device 2 represents the wireless terminal device of the present invention, and includes peripheral equipment such as combined machines, printers and projectors. Each of the WUSB hosts 3a to 3c represents the wireless control station of the present invention, and includes a versatile personal computer capable of communicating with WUSB.

Figure 2:
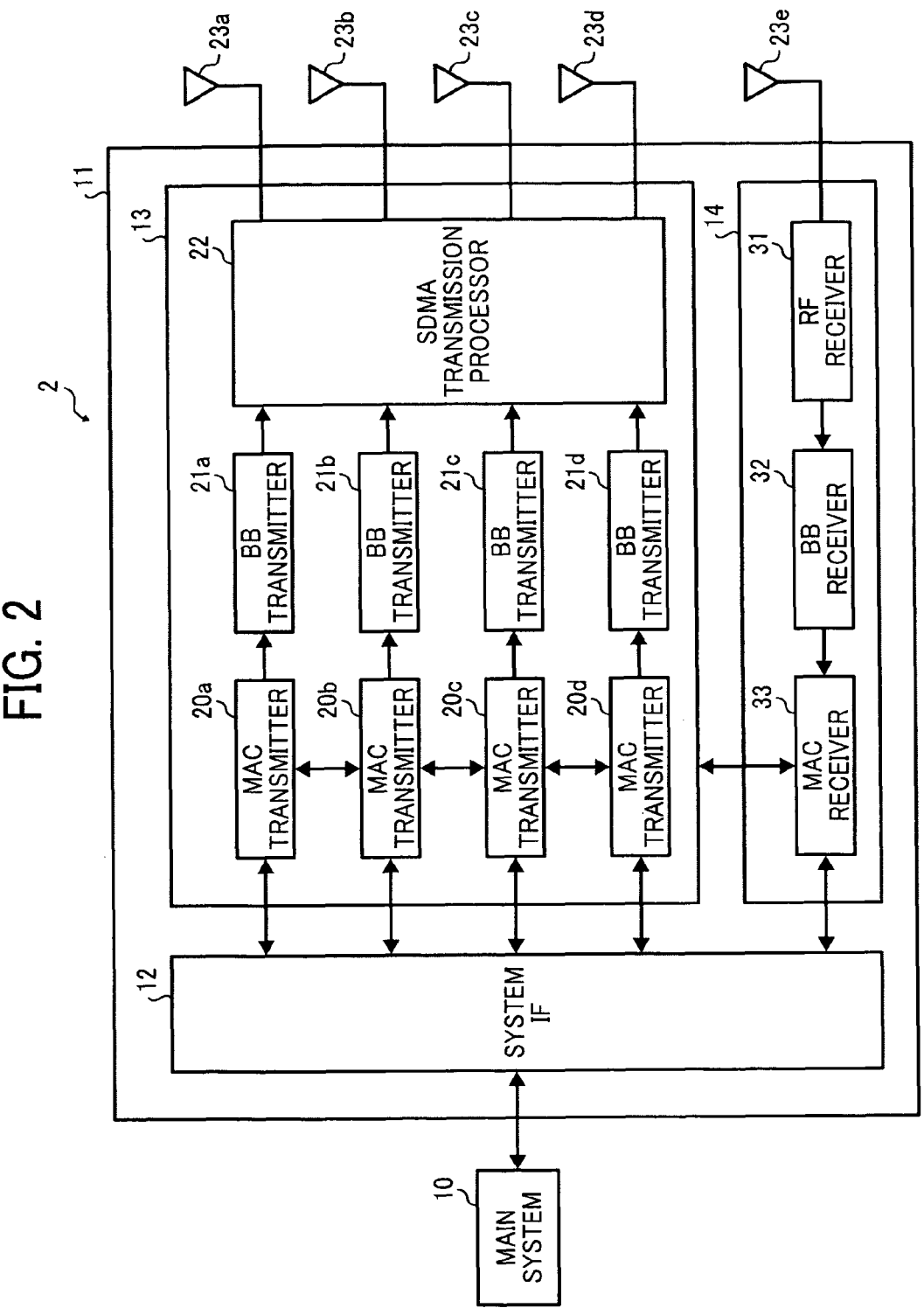
FIG. 2 is a block diagram of a WUSB device constituting the embodiment of the wireless access system of the present invention.

As shown in FIG. 2, the WUSB device 2 includes a main unit system 10 to control a main unit of peripheral equipment such as combined machines, printers and projectors, and a WUSB device communicator 11 to transmit and receive data to and from each of the WUSB hosts 3a to 3c.

The WUSB device communicator 11 includes a main system 10, a system IF 12 which inputs and outputs data, a SDMA transmitter 13 which transmits data to each of the WUSB hosts 3a to 3c through space-division multiple access (SDMA) communication and a TDMA receiver 14 which receives data transmitted from each of the WUSB hosts 3a to 3c through time-division multiple access (TDMA) communication.

The SDMA transmitter 13 includes media access control (MAC) transmitters 20a to 20d, baseband (BB) transmitters 21a to 21d, a SDMA transmission processor 22 and antenna elements 23a to 23d.

In FIG. 2, each four MAC transmitters 20a to 20d, BB transmitters 21a to 21d and antenna elements 23a to 23d are shown, but the numbers thereof are not limited thereto.

Each of the MAC transmitters 20a to 20d subject data input from the main system 10 through the system IF 12 to a transmission process relating to MAC layer and output the processed data to the BB transmitters 21a to 21d, respectively.

The BB transmitters 21a to 21d modulate the data input from the MAC transmitters 20a to 20d to BB signals, respectively. The SDMA transmission processor 22 duplicates each of the BB signals to the number of the transmission antenna elements, multiplies the BB signal by an adjustment factor relating to an amplitude and a phase in the direction of the WUSB hosts 3a to 3c to up-convert the signal to a radio frequency (RF) signal, and transmits the RF signals as electric waves through the antenna elements 23a to 23d, respectively.

In FIG. 1, same signals only different in amplitude and phase are transmitted from the four antenna elements, and a directive signal in the direction of the WUSB host 3a is synthesized in a space. When adjustment factor relating to an amplitude and a phase in the direction of the WUSB hosts 3b and 3c, a directive signal is synthesized as well.

The electric waves transmitted from each of the antenna elements 23a to 23d are synthesized in a space and transmitted to directional spaces 4a to 4c, respectively as FIG. 1 shows. At least one of the antenna elements 23a to 23c is located at least one of directional spaces 4a to 4c.

In FIG. 2, the TDMA receiver 14 includes a an antenna 30, an RF receiver 31 which down-converts an RF signal received through the antenna 30 to a BB signal, a BB receiver 32 which demodulates the BB signal and a MAC receiver 33 which subjects the demodulated data to a reception process relating to MAC layer and outputs the data to the main system 10 through the system IF 12. The TDMA receiver 14 can share the antenna elements 23a to 23d instead of the antenna 30 by time-division with the SDMA transmitter 13.

Figure 3:
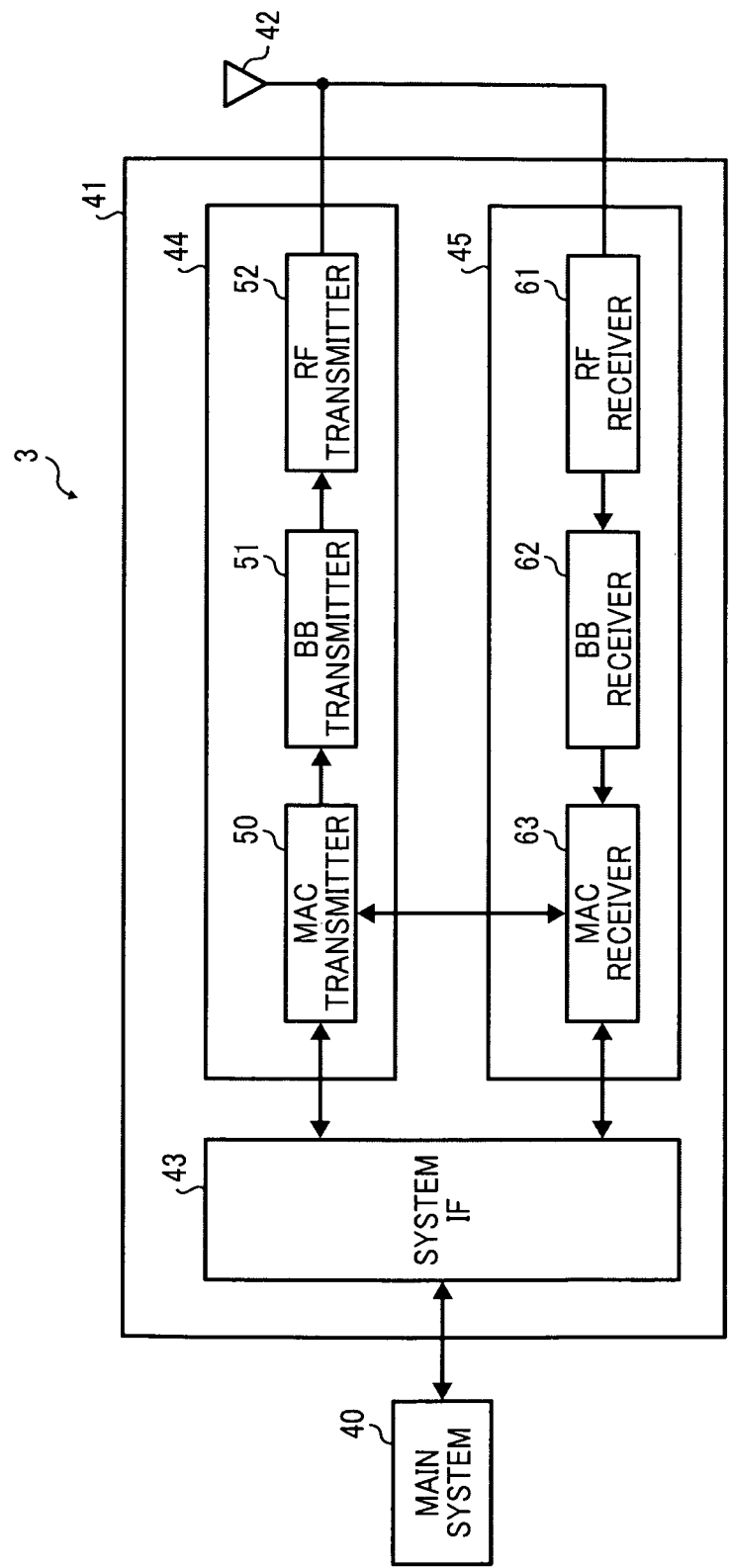
FIG. 3 is a block diagram of a WUSB host constituting the embodiment of the wireless access system of the present invention.

Each of the WUSB hosts 3a to 3c (hereinafter referred to as "WUSB host 3" collectively) include, as shown in FIG. 3, a main system 40 which performs a process relating to a layer prior to the MAC layer, a WUSB host communicator 41 for transmitting and receiving data to and from a WUSB device 2, and an antenna 42.

The WUSB host communicator 41 includes a system IF 43 which inputs and outputs data with the main system 40, a transmitter 44 which transmits data to the WUSB device 2 through TDMA communication and a receiver 45 which receives a directional space signal transmitted from the WUSB device 2 through TDMA communication to its own station.

The transmitter 44 includes a MAC transmitter 50, a BB transmitter 51 and an RF transmitter 52. The MAC transmitter 50 subjects data input from the main system 40 through the system IF 43 to a transmission process relating to MAC layer and outputs the processed data to the BB transmitter 51.

The BB transmitter 51 modulates data input from the MAC transmitter 50 to a BB signal. The RF transmitter 52 up-converts the BB signal to an RF signal, and transmits the RF signal as an electric wave through an antenna 42.

The receiver 45 includes an RF receiver 61 which down-converts an RF signal received through the antenna 42 to a BB signal, a BB receiver 62 which demodulates the BB signal and a MAC receiver 63 which subjects the demodulated data to a reception process relating to MAC layer and outputs the data to the main system 40 through the system IF 43.

A signal received by the antenna 42 is transmitted by the WUSB device 2 so as to have a directivity to a directional space the WUSB host 3 is located in, and a signal transmitted to the other directional spaces as an interference signal has a level considerably lower than that of a signal to its own station. Therefore, the WUSB host 3 does not need an interference wave removal process at the receiving side.

The MAC transmitters 20a to 20d and the MAC receiver 33 of the WUSB device 2, and the MAC transmitter 50 and the MAC receiver 63 of each of the WUSB hosts 3a to 3c will specifically be explained.

The MAC transmitters 20a to 20d and the MAC receiver 33 of the WUSB device 2, and the MAC transmitter 50 and the MAC receiver 63 of each of the WUSB hosts 3a to 3c perform transmission and reception process relating to MAC layer substantially according to WUSB standard using WiMedia standard (WiMedia Alliance, "MAC Specification: RELEASE 1.5", [online], Dec. 1, 2009, [searched on Jun. 23, 2010], internet <URL: http://www.wimedia.org/imwp/download.asp?ContentID=16552>).

In WiMedia standard, every station (WUSB device 2 and WUSB hosts 3a to 3c) of every super frame having a cycle of 65,536 µs, formed of 256 media access slots (MAS) having a 256 µs period transmits and receives a beacon to and from each other in a beacon period at the head of the frame to synchronize time of system. Every station adjusts and reserves MAS with beacon and transmits and receives data to and from the other stations with time-division using a reserved MAS period.

A protocol which reserves MAS is called DRP (Distributed Reservation Protocol). The beacon signal includes MAS reservation request, response information (DRP IE) and present reservation status information (DRP Availability IE). Every station can always grasp the reservation status of 256 MAS with information included in the beacon signal.

In the WUSB standard, the WUSB host transmits a management frame called MMC (Micro-scheduled management Command) to a WUSB device to be controlled, and each WUSB device transmits and receives data and communication response packet to and from the WUSB host at a time designated by the MMC transmitted from the WUSB host.

Therefore, the WUSB standard using the WiMedia standard reserves MAS which is a data transmission period of the WUSB host and MAS which is a data transmission period of the WUSB device according to DRP, and transmits and receives data with the reserved MAS.

The MAC transmitters 20a to 20d of the WUSB device 2 reserve MAS which is a date transmission period according to DRP as the MAC transmitter 50 of the WUSB hosts 3a to 3c to transmit data in the same period through SDMA communication, and transmits data with the reserved MAS.

The MAC receiver 63 of each of the WUSB hosts 3a to 3c, monitors MAS data reserved by MAC transmitters 20a to 20d of the WUSB device 2, and when the MAC receiver 63 detects data addressed thereto, it subjects the data to a reception process relating to MAC layer.

An operation example of the thus wireless access system 1 will be explained, referring to FIGS. 4 and 5.

Figure 4:
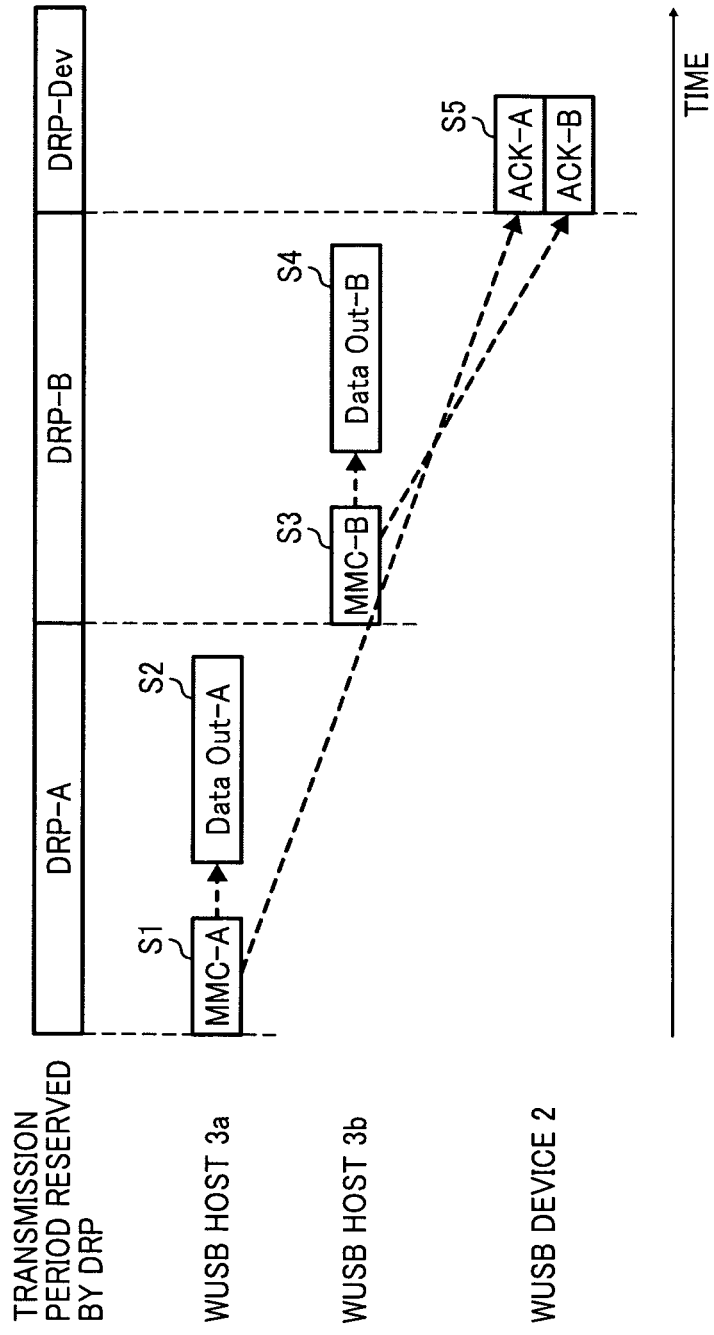
FIG. 4 is a timing diagram of a first operational example of the embodiment of the wireless access system of the present invention.

In FIG. 4, first, the WUSB host 3a transmits data, next, the WUSB host 3b transmits date, and the WUSB device 2 having received the data returns a response signal (ACK) through SDMA communication.

In FIG. 4, in one super frame of the WiMedia standard, DRP-A represents at least one MAS reserved by the MAC transmitter 50 of the WUSB host 3a, DRP-B represents at least one MAS reserved by the MAC transmitter 50 of the WUSB host 3b, and DRP-Dev represents at least one MAS reserved by the MAC transmitters 20a to 20d of the WUSB device 2.

First, in DRP-A, the MAC transmitter 50 of the WUSB host 3a transmits MMC (MMC-A in FIG.) including data transmission time, ACK transmission request time of the data and next MMC transmission time, and the WUSB device 2 receives this (STEP S1). The MAC transmitter 50 of the WUSB host 3a designates time in DRP-Dev as the ACK transmission request time.

At the data transmission time designated by MMC, the MAC transmitter 50 of the WUSB host 3a transmits data (Date Out-A in FIG.), and the WUSB device 2 receives this STEP S2).

Next, in DRP-B, the MAC transmitter 50 of the WUSB host 3b transmits MMC (MMC-B in FIG.) including data transmission time, ACK transmission request time of the data and next MMC transmission time, and the WUSB device 2 receives this (STEP S3). The MAC transmitter 50 of the WUSB host 3b designates time in DRP-Dev as the ACK transmission request time.

At the data transmission time designated by MMC, the MAC transmitter 50 of the WUSB host 3b transmits data (Date Out-B in FIG.), and the WUSB device 2 receives this STEP S4).

Next, in DRP-Dev, at the ACK transmission request time designated by each MMC, the MAC transmitters 20a to 20b of the WUSB device 2 corresponding to the directional spaces 4a and 4b where the WUSB hosts 3a and 3b are located start transmitting ACK or NACK relative to the reception result of each data, and the WUSB hosts 3a and 3b receive ACK addressed thereto (STEP S5).

Each signal which represents ACK transmitted from the MAC transmitters 20a and 20b of the WUSB device 2 is transmitted to the directional spaces 4a and 4b by the SDMA transmitter 22 through the antenna elements 23a and 23c.

Figure 5:
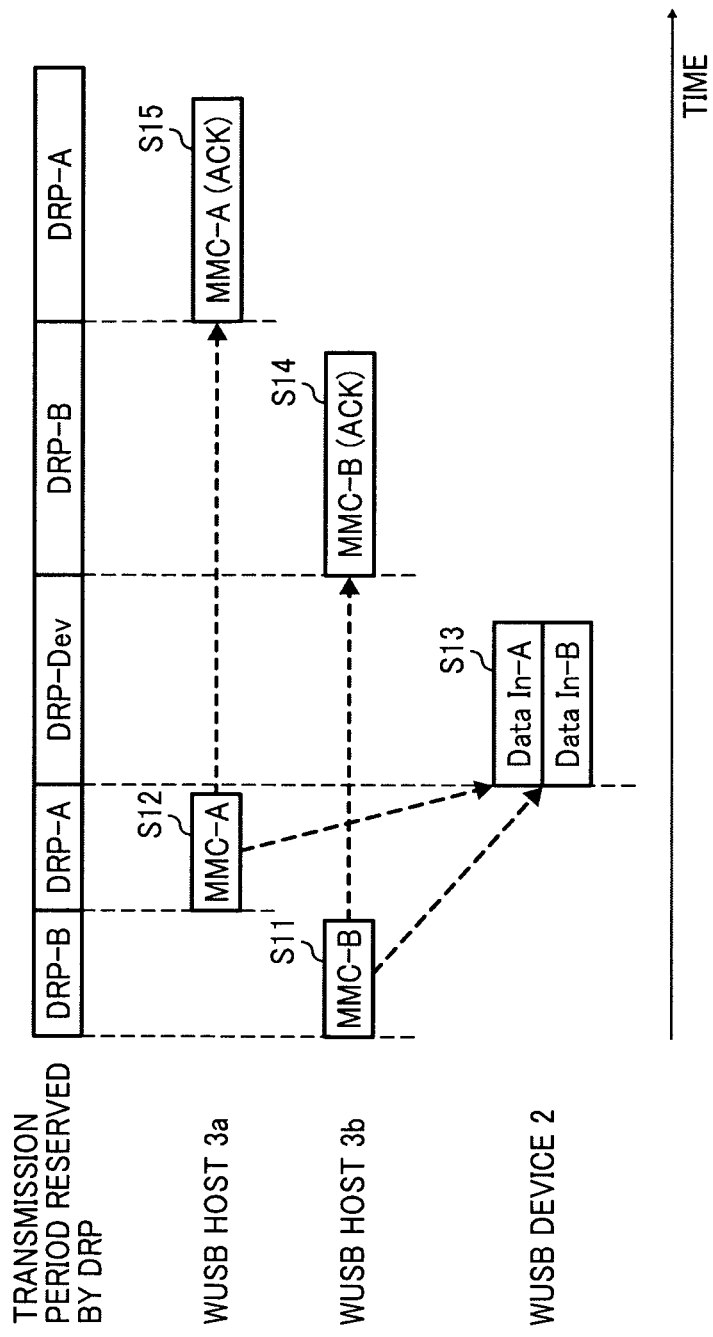
FIG. 5 is a timing diagram of a second operational example of the embodiment of the wireless access system of the present invention.

FIG. 5 represents an example where the WUSB host 3b requests for data first, the WUSB host 3a requests for data, the WUSB device 2 transmits the requested data through SDMA communication, and the WUSB hosts 3a and 3b return ACK relative to the data they received.

In FIG. 5, in a super frame in the WiMedia standard, DRP-A represents at least one MAS reserved by the MAC transmitter 50 of the WUSB host 3a, DRP-B represents at least one MAS reserved by the MAC transmitter 50 of the WUSB host 3b, and DRP-Dev represents at least one MAS reserved by the MAC transmitters 20a to 20d of the WUSB device 2.

First, in DRP-B, the MAC transmitter 50 of the WUSB host 3b transmits MMC (MMC-B in FIG.) including data transmission request time and next MMC transmission time including ACK relative to the data, and the WUSB device 2 receives this (STEP S11). The MAC transmitter 50 of the WUSB host 3b designates time in DRP-Dev as the data transmission request time.

Next, in DRP-A, the MAC transmitter 50 of the WUSB host 3a transmits MMC (MMC-A in FIG.) including data transmission request time and next MMC transmission time including ACK relative to the data, and the WUSB device 2 receives this (STEP S12). The MAC transmitter 50 of the WUSB host 3a designates time in DRP-Dev as the data transmission request time.

Next, in DRP-Dev, at the data transmission request time designated by each MMC, the MAC transmitters 20a to 20b of the WUSB device 2 corresponding to the directional spaces 4a and 4b where the WUSB hosts 3a and 3b are located start transmitting each data (Data In-A and Data In-B in FIG.), and the WUSB hosts 3a and 3b receive ACK addressed thereto (STEP S13).

Each signal which represents data transmitted from the MAC transmitters 20a and 20b of the WUSB device 2 is transmitted to the directional spaces 4a and 4b by the SDMA transmitter 22 through the antenna elements 23a and 23c.

Next, in DRP-B, at the next MMC transmission time designated by MMC-B, the MAC transmitters 50 of the WUSB host 3b transmits MMC (MMC-B (ACK) in FIG.) including ACK or NACK response showing data reception results from the WUSB device (STEP S14).

Next, in DRP-A, at the next MMC transmission time designated by MMC-A, the MAC transmitters 50 of the WUSB host 3a transmits MMC (MMC-A (ACK) in FIG.) including ACK or NACK response showing data reception results from the WUSB device (STEP S15).

As explained above, the wireless access system 1 of the present invention transmits data from the WUSB device 2 to the WUSB hosts 3a to 3c through SDMA communication in upbound transmission and from the WUSB hosts 3a to 3c to the WUSB device 2 through TDMA communication in downbound transmission. Therefore, in multiple wireless communication between the plural WUSB hosts 3a to 3c and the WUSB device 2, interference between wireless signals from the WUSB hosts 3a to 3c is prevented and interference wave removal process in the WUSB device 2 is not needed.

The wireless access system 1 of the present invention conjugately controls the plural WUSB hosts 3a to 3c and one WUSB device 2 using time division. Plural WUSB hosts can conjugately use a WUSB device, which is difficult for conventional WUSB standard ("Wireless Universal Serial Bus Specification Revision 1.0", [online], May 12, 2005, [searched on Jun. 23, 2010], internet <URL:http://www.usb.org/developers/wusb/wusb_2007_0214.zip>).

The wireless access system 1 of the present invention connects the WUSB device 2 such as printers, combined machines and projectors to the plural WUSB hosts 3a to 3c such as personal computers at the same time so that they can conjugately use the WUSB device 2.

An example in which the wireless access system 1 of the present invention performs time-division duplex communication between the WUSB device 2 and the WUSB hosts 3a to 3c according to WiMedia standard has been explained. In the present invention, the wireless access system may perform time-division duplex communication between the WUSB device 2 and the WUSB hosts 3a to 3c using PCF (Point Coordination Function) control of WLAN (Wireless Local Area Network).

An example in which communication between the WUSB device 2 and the WUSB hosts 3a to 3c is made by time-division duplex communication has been explained, and in the present invention, the wireless access system of the present invention may perform frequency-division duplex communication between the WUSB device 2 and the WUSB hosts 3a to 3c.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2010-157591 filed on Jul. 12, 2010, the entire contents of which are herein incorporated by reference.

What is claimed is:

1. A wireless access system, comprising:

a plurality of wireless control stations; and a first wireless terminal device configured to transmit and receive data to and from the plurality of wireless control stations, wherein each of the plurality of wireless control stations includes, a transmitter configured to adjust to every other wireless control station and the first wireless terminal device to reserve first data transmission periods that do not overlap with those of the other wireless control stations and the first wireless terminal device, and transmit data in the first reserved periods, wherein the first wireless terminal device includes, a time division multiple access (TDMA) receiver configured to receive first data transmitted by at least a first one of the plurality of wireless control stations using a time-division multiple access communication, and a space division multiple access (SDMA) transmitter configured to transmit second data to at least the first one of the plurality of wireless control stations using space-division multiple access communication, wherein the SDMA transmitter of the first wireless terminal device is configured to transmit a response signal in a directional space through a MAC transmitter corresponding to a space where the wireless control station that transmitted the first data is located, based on a transmit request time designated by the wireless control station that transmitted the first data when the TDMA receiver receives the first data, wherein the first wireless terminal device is configured to adjust to the plurality of wireless control stations to reserve a second data transmission period that does not overlap with data transmission periods of the plurality of wireless control stations, and transmit the second data in the second reserved period, wherein the first wireless terminal device is configured to previously reserve a time band for performing space-division multiple access communication so as not to overlap with a transmission period of one or more of the plurality of wireless control stations and notify each of the plurality of wireless control stations of the time band, wherein the first wireless terminal device is one of a plurality of wireless terminal devices, wherein each of the plurality of wireless control stations is configured to send a transmission request requesting at least one wireless terminal device under its control from among the plurality of wireless terminal devices to transmit data and a response signal so as to be included in a time band reported from another wireless terminal device, wherein the first wireless terminal device is configured to receive the transmission request, and wherein the first wireless terminal device is configured to transmit the second data and the response signal according to the transmission request.

2. The wireless access system of claim 1, wherein the first wireless terminal device is configured to transmit data to the first wireless control station with a carrier wave having a frequency different from that of the data received from the first wireless control station.

3. The wireless access system of claim 1, wherein the SDMA transmitter is configured to transmit different modulated signals to a plurality of directional spaces, and the TDMA receiver is configured to only receive a single modulated signal.

* * * * *